Aug. 16, 1960 G. F. CLOSS 2,949,322
ROTARY MECHANICAL SEAL
Filed March 5, 1957
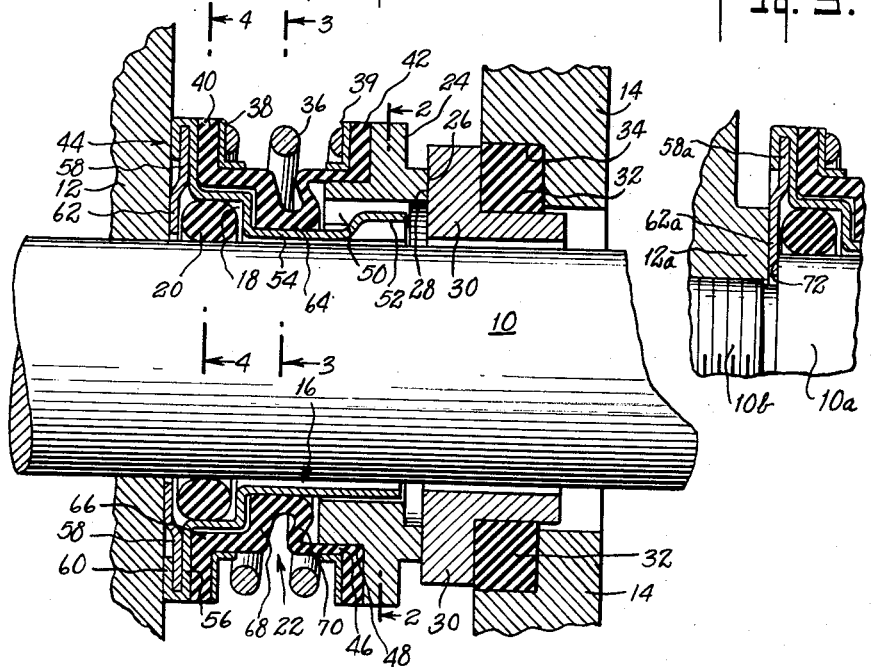
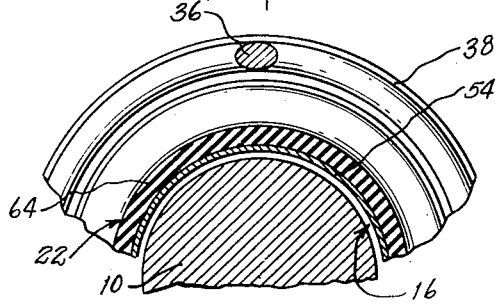
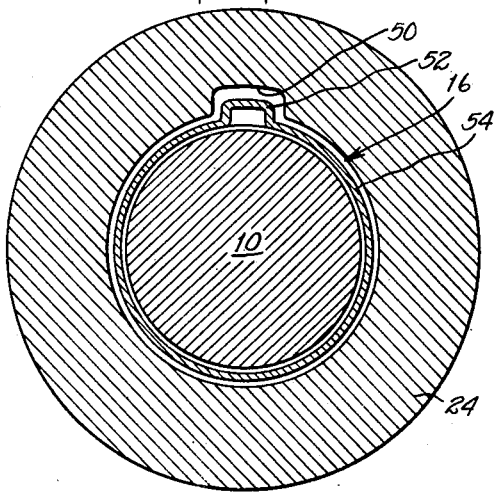
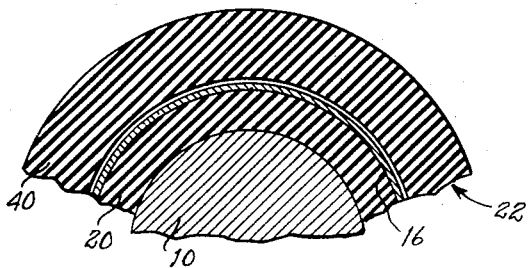
INVENTOR:
GEORGE F. CLOSS
BY Robert Henderson
ATTORNEY

United States Patent Office 2,949,322
Patented Aug. 16, 1960

2,949,322

ROTARY MECHANICAL SEAL

George F. Closs, Palmyra, N.Y., assignor to Garlock, Inc., a corporation of New York Filed Mar. 5, 1957, Ser. No. 644,100

10 Claims. (Cl. 286—11)

This invention relates to mechanical seals, particularly the type which are mounted upon and constrained to turn with a shaft or equivalent rotary element and effect a seal against passage of fluid between said rotary element and a surrounding machine casing into which the rotary element extends.

In such seals, it is common to provide a metal sleeve with means for sealing it in relation to the shaft and for constraining it to turn with the shaft. Such seals usually have an annular flexible element, effecting a seal between the metal sleeve and a rotary sealing ring which, in turn, effects a sliding seal with a surface of or associated with a machine casing through or into which the shaft extends. The flexibility of the flexible element enables the seal to function effectively despite some axial movement of the shaft in relation to the machine casing.

An important object of this invention is the provision of an improved arrangement which maintains the concentricity of the flexible element and the rotary sealing ring much more satisfactorily than prior arrangements, despite the effect of centrifugal force strongly tending to throw the said rotating parts out of concentricity.

Another important object is the provision of an improved metal sleeve which is economical to produce and has a sturdy end structure for backing the flexible element and an internal annular groove which retains therein a packing and drive ring against material shifting in either axial direction relatively to the metal sleeve.

The foregoing and other more or less obvious objects are accomplished by the present invention of which two preferred embodiments are shown in the accompanying drawing without, however, limiting the invention to those particular embodiments.

In the drawings:

Figure 1 is a central, axial, sectional view of a seal according to a first embodiment of this invention.

Figs. 2, 3 and 4 are, respectively, transverse, sectional views substantially at the planes indicated by lines 2—2, 3—3, and 4—4 of Fig. 1.

Fig. 5 is a fragmentary, axial, sectional view of the back end of a seal according to a second embodiment of this invention.

The seal illustrated in Figs. 1–4 is shown in one of various ways in which it may be used, arranged to effect a seal between rotary machine parts consisting of a shaft 10 having a pump impeller 12 rigidly fixed to the shaft and constrained to turn therewith, and a stationary machine part which is a pump casing 14 into which the shaft extends to support and turn the impeller. The adjacent portions of the pump casing and of the impeller are shown only fragmentarily and may be of various shapes which have no particular relation to this invention.

The seal comprises a sheet-metal sleeve 16 having, in an internal groove 18 thereof, a radially compressed O ring 20 of rubber, synthetic rubber, or other suitable, flexible or deformable packing material which supports the metal sleeve on the shaft 10, seals said sleeve relatively to the shaft, and constrains said sleeve to turn with the shaft.

The seal further comprises a more or less sleeve-like flexible sealing element or bellows 22 of impermeable rubber, synthetic rubber or equivalent flexible material, effecting a seal between the metal sleeve 16 and a rigid, rotary sealing ring 24 having a flat, annular surface 26 in sliding sealing engagement with a flat, annular surface 28 of a rigid, stationary sealing ring 30, vibrationally supported by a vibration ring 32 which is seated within an annular rabbet 34 in the pump casing 14; the ring 32 being of soft rubber or other suitable resilient packing material.

A compression coil spring 36, encircling the bellows 22, has its ends seated against washers 38, 39 which, in turn, seat against radial end flanges 40, 42 of the bellows. The outer flat surface of flange 40 engages, and may be suitably cemented to, an adjacent flat surface of a radial flange 44 of the metal sleeve 16 and the flange 44 backs against a flat surface of the impeller 12. The flange 42 and an adjoining cylindrical portion 46 of the bellows engage and may be suitably cemented within an annular rabbet 48 formed in the rotary sealing ring 24.

The rotary sealing ring 24 is formed with an internal, axially extending slot 50 and the metal sleeve 16, at its adjacent end, has an axially extending lug 52 pressed outwardly therefrom and slidably extending within the slot 50 to constrain the ring 24 to turn with said metal sleeve while permitting the ring 24 to shift axially relatively to the sleeve, to maintain sealing engagement with the stationary sealing ring 30. By thus constraining ring 24 to turn with the metal sleeve 16, it as assured that twisting of the flexible sleeve 22, with probable resultant damage thereto, will not occur. The lug 52 also functions to hold the parts of the seal together as a unitary device prior to its installation in a machine for use, such functioning arising from axial interference of said lug with the intermediate portion of flexible sleeve 22.

The O ring 20 in its normal condition as manufactured, is substantially circular in shape in section, and is of an outside diameter greater than the diameter of the groove 18 and of an inside diameter less than that of the shaft on which the seal is to be used. Stated differently, the O ring is normally of a greater thickness than the distance between the bottom of groove 18 and the opposed surface of the shaft. The O ring, therefore, tightly engages the bottom of said groove and the shaft to serve as a driving means constraining the metal sleeve 16 to turn with the shaft and to serve, also, as a sealing means preventing passage of fluid axially between the shaft and the metal sleeve.

The seal is illustrated in its operative condition in which the spring is under compression, holding flange 44 of the metal sleeve backed against the impeller and yieldably holding rotary realing ring 24 against the stationary sealing ring 30 to effect a rotary sliding sealing therewith. Although it has been suggested that flanges 40, 42 and cylindrical portion 46 of the flexible sleeve 22, may be cemented to the metal flange 44 and to rotary sealing ring 24, it should be realized that, even if the said parts are not thus cemented together, the spring 36 will hold the flexible sleeve firmly in sealing association with the metal flange 44 and the rotary sealing ring 24.

There is a substantial advantage in having the rubber O ring retained within a complete or closed-end, rectangular groove, such as groove 18, rather than merely in an open-end, annular rabbet-type of groove because, with the latter arrangement, placing of the seal upon the shaft by sliding it rightwardly thereon (as would be done in some machine structures) would strongly tend to push the O ring out of such a rabbet. If provided with a complete rectangular groove, like groove 18, the seal can be slid in either direction upon the shaft without any possibility of the O ring becoming dislodged. Additionally, the generally circular cross-sectional shape of the O ring makes it more easily slid upon an end of a shaft, and with less chance of damage to the O ring, than if a packing ring of rectangular shape in section were employed in place of the O ring.

A closed-end, annular groove, like groove 18, may be formed in various ways, but it can be very economically formed by shaping and completing the metal sleeve 16, as shown in the drawing. Thus, the said sleeve may comprise a main sleeve portion 54, deformed radially outwardly and then axially or cylindrically to form the bottom and one side of groove 18.

The metal of sleeve 16 adjoining the portion thereof which defines the bottom of groove 18 is deformed radially outwardly to form an inner wall 56 of flange 44, then is sharply bent about the outer periphery of an annular end plate 58 and inwardly to form an outer wall 60 of the flange 44 about an outer marginal area of the plate 58. The walls 56 and 60 are clinched tightly upon the plate 58 and, at a circular area about midway between the inner and outer peripheries of said plate, the latter is preferably offset or dished so that an inner marginal portion 62 of said plate will be coplanar with outer wall 60 of the metal sleeve so that, at that end, the said sleeve will lie flat against the impeller 12 both at the wall 60 and at the marginal portion 62. The width or axial dimension of the groove 18 preferably should be sufficient to permit unimpeded axial distention of the O ring 20 when the latter is compressed radially upon installation. The offsetting or dishing of plate 58 so that its portion 62 is coplanar with wall 60 yields the advantage of affording accurate mounting dimensions either with reference to a large flat surface as illustrated or with reference to a small shaft shoulder as, for example, where a snap ring might be used in a groove in the shaft as a stop.

It will be readily apparent that the disclosed structure of the metal sleeve 16 includes an economically formed groove 18 for the O ring; and that in forming said groove the flange 44 is provided as a portion against which the flange 40 of the flexible sealing element may seat.

It is believed that the shape of the bellows 22 and of the metal sleeve and their relationship to each other as illustrated yield improved operational results. Thus, the bellows has an intermediate, approximately cylindrical portion 64 which is in accurate contact fit with the within portion of the metal sleeve whereby to effect and satisfactorily maintain centering of the bellows and the rotary sealing ring 24 with respect to the metal sleeve. This constitutes a marked improvement over prior bellows structures which have been mounted and centered upon such a sleeve at the end of the bellows remote from the rigid, rotary sealing ring.

In such prior arrangements, the rigid, rotary sealing ring and the adjacent end of the bellows, because of the bellows' support at its distal end upon the metal sleeve, have a pronounced tendency to whip in response to centrifugal force, thereby impairing smooth sliding operation of the rigid, rotary sealing ring against the rigid, stationary sealing ring. This lack of smoothness of operation is in the nature of a tendency of the rigid, rotary ring to wobble, thereby introducing objectional fluid leakage between the two rigid sealing rings. Such wobbling increases the wear; and the whipping causes the smaller, flat sealing surface, usually on the rotary sealing ring, to slide radially as well as rotatively upon the sealing surface of the stationary ring as a result of which the two sealing surfaces do not become as perfectly ground to each other as is desirable for good sealing results. By centering the bellows upon the metal sleeve, at the bellows' intermediate portion 64, whipping of the rotary ring 24 is greatly minimized, thereby avoiding the disadvantages just recited.

Another advantage in the disclosed bellows structure arises from the condition in which a cylindrical portion 66 of the bellows, at the back or left end of the seal as it appears in the drawing, is substantially clear of the underlying cylindrical portion of the metal sleeve, and the radial portion 68 of the rubber sealing element 22 likewise is substantially clear of the adjacent radial wall of the metal sleeve. By providing that the portions 66 and 68 of the rubber sleeve be substantially clear of the metal sleeve, the rubber sleeve is given greater axial or endwise flexibility than otherwise would be possible.

The flexibility at portions 66 and 68 of the rubber sleeve is such as to allow the latter portions to adjust themselves in relation to the axial dimension between the metal flange 44 and the rigid, rotary sealing ring 24, upon installation of the seal in a machine. This self-adjustment occurs by reason of the fact that, during or before initial operation of the seal, the portion 64 of the bellows may slide slightly forwardly or rearwardly upon portion 54 of the metal sleeve. After such self-adjustment, the bellows portion 64 remains in substantially fixed relation to metal sleeve portion 54, leaving the S-shaped section 70 of the bellows to flex freely if and as the shaft and machine casing axially shift rapidly or vibrate relatively to each other in operation of the machine; a condition which may arise from end play of the shaft in its bearings.

It will be understood that the rigid sealing ring may be formed of suitable compositions or alloys. Also, despite the fact that ring 30 may vibrate somewhat because of being supported by rubber ring 32, it is spoken of as a "stationary" ring to distinguish its function from the rotation of the rotary ring 24.

The seal according to the second embodiment, illustrated in Fig. 5, differs from the seal of the first embodiment in that the inner marginal portion 62a of plate 58a extends inwardly to such an extent that the central opening in said plate is of lesser diameter than main portion 10a of the shaft but of greater diameter than reduced threaded portion 10b of the shaft. Under this arrangement the inner margin of the plate 58a is firmly clamped between an impeller 12a, threaded upon shaft portion 10b, and a shoulder 72 adjoining shaft portions 10a and 10b. The structure of the second embodiment may be preferred where a more positive drive of the rotary seal by the shaft is desired than could be derived solely from O ring 20 or a more or less equivalent packing ring, as, for example, where the seal is to be used under high speed or intermittent service conditions, or in gear-driven pumps.

It should be noted that although an O ring 20, as illustrated, has some advantages, it is not essential for the packing ring in the groove 18 to be an O ring; but, without departing from the invention, a packing ring at that point may be of other than circular shape in cross section as, for example, square, rectangular or octagonal.

Although a seal according to this invention is described herein as a rotary seal useful upon a rotary shaft, the invention also is useful upon a stationary shaft to effect a sliding seal with a machine casing which rotates about the stationary shaft.

It should be apparent that the concepts disclosed herein may be utilized in various other ways without, however, departing from the invention as set forth in the following claims.

I claim:

1. A rotary seal for effecting a fluid seal between a machine casing and a machine element which is rotatable relative to said casing, said seal comprising a metal sleeve surrounding, sealed with respect to and arranged to rotate with said rotary machine element, a rigid, rotary sealing ring adjacent to one end of said sleeve and adapted to effect a sliding, rotary seal with a surface associated with said machine casing, a flexible, sleeve-like, sealing bellows, encircling said metal sleeve and having one end portion in fixed sealing association with said rotary sealing ring, an opposite end portion in fixed sealing association with the other end of said metal sleeve, and an intermediate, cylindrical, bellows centering portion, of substantial width and thickness, in accurate contact fit with a within, substantially wide, cylindrical surface area of said sleeve, and a radial web, substantially thinner than said bellows centering portion, integrally interconnecting the latter and said one end portion of the bellows; said web being freely flexible with axial shifting of said rotary sealing ring and coacting with said bellows centering portion to restrain said rotary sealing ring against shifting other than axial shifting.

2. A seal according to claim 1, said rigid, rotary sealing ring having an internal, axially extending slot and said metal sleeve having, toward the latter's mentioned one end, a lug slidable in said slot for constraining said ring to turn with said metal sleeve while permitting said ring to move axially relatively to the metal sleeve; said lug being in axially interfering relationship to an end of said bellows centering portion whereby to oppose disassociation of the bellows from the metal sleeve over the latter's mentioned one end.

3. A seal according to claim 1, both said end portions of the bellows comprising radial flanges which are in sealing engagement with radial surfaces of the metal sleeve and the rotary sealing ring, and interconnecting cylindrical portions which are clear of the metal sleeve and interconnect said radial flanges and said centering portion of the bellows.

4. A seal according to claim 3, further including a coil spring compressed between radial flanges of the bellows, tending to expand the latter axially to maintain said radial flanges of the bellows in sealing engagement with said radial surfaces of the metal sleeve and the rotary sealing ring.

5. A rotary seal for effecting a fluid seal between a machine casing and a machine element which is rotatable relative to said casing, said seal comprising a metal sleeve surrounding said rotary machine element and having a radially enlarged rear end portion, defining an internal annular groove for receiving a packing ring, and a flange extending radially outwardly from said enlarged rear end portion, a rigid, rotary sealing ring adjacent to the forward end of said sleeve, a flexible, sleeve-like, sealing bellows, encircling said metal sleeve and having a forward end portion in fixed sealing association with said rotary sealing ring, a radial flange at its rear end in face-to-face sealing engagement with the said radial flange of the metal sleeve, an intermediate, cylindrical, bellows centering portion, of substantial width and thickness, in accurate contact fit with a within, substantially wide, cylindrical surface area of said sleeve, and a radial web, substantially thinner than said bellows centering portion, integrally interconnecting the latter and said forward end portion of the bellows; said web being freely flexible with axial shifting of said rotary sealing ring and coacting with said bellows centering portion to restrain said rotary sealing ring against shifting other than axial shifting; the seal, further, including a spring, compressed between said rotary sealing ring and said radial flange of the bellows, holding the latter flange against said radial flange of the metal sleeve and urging the rotary sealing ring forwardly.

6. A rotary seal for effecting a fluid seal between a machine casing and a machine element which is rotatable relative to said casing, said seal comprising a metal sleeve having a main portion extending about said rotary machine element, an enlarged portion extending radially outwardly and axially rearwardly from said main portion, forming an internal groove for a packing ring, and a flange extending radially outwardly from said enlarged portion, a rigid, rotary sealing ring adjacent to the forward end of said sleeve, a flexible, sleevelike, sealing bellows, encircling said metal sleeve and having a forward end portion in fixed sealing association with said rotary sealing ring and a radial flange at its rear end in sealing engagement with said flange of the sleeve, a spring, compressed between said rigid, rotary sealing ring and said radial flange of the bellows, holding the latter flange against said radial flange of the metal sleeve and urging the rotary sealing ring forwardly, and an annular plate disposed intimately against the rear face of said flange of the sleeve and having an inner marginal portion in axial alignment with said groove for retaining a packing ring against axial dislodgment from said groove; said metal sleeve having a portion extending about and radially inwardly over an outer marginal portion of said plate to hold the latter against disassociation from the metal sleeve.

7. A seal according to claim 6, the inner marginal portion of said plate defining a circular opening of less diameter than said main portion of the metal sleeve, and being adapted to be clamped between a radial surface of a shaft on which the seal is mounted and a radial surface of a member rigidly mounted on the shaft.

8. A seal according to claim 6, said plate having its outer marginal portion offset axially inwardly in relation to its inner marginal portion and the said radially inwardly extending portion of the metal sleeve being coplanar with the inner marginal portion of said plate.

9. A seal according to claim 6, further including, in said groove, a packing ring, opposite side walls of which, when the packing ring is under radial compression, taper axially toward each other into contact with said rotatable machine element, thereby enabling the seal to be applied by being slid in either axial direction upon said rotatable machine element without damage to said packing ring.

10. A seal according to claim 9, said packing ring being substantially circular in axial section.

References Cited in the file of this patent
UNITED STATES PATENTS

| | | |
|---|---|---|
| 2,432,694 | Snyder | Dec. 16, 1947 |
| 2,472,257 | Matter | June 7, 1949 |
| 2,474,123 | Schmitz | June 21, 1949 |
| 2,489,212 | Zwack | Nov. 22, 1949 |
| 2,598,886 | Brummer | June 3, 1952 |
| 2,717,790 | Chambers | Sept. 13, 1955 |
| 2,754,162 | Tapp | July 10, 1956 |

UNITED STATES PATENT OFFICE
CERTIFICATE OF CORRECTION

Patent No. 2,949,322                                    August 16, 1960

George F. Closs

It is hereby certified that error appears in the printed specification of the above numbered patent requiring correction and that the said Letters Patent should read as corrected below.

Column 5, line 35, claim 4, before "radial" insert -- said --.

Signed and sealed this 31st day of January 1961.

(SEAL)
Attest:

KARL H. AXLINE                                          ROBERT C. WATSON
Attesting Officer                                      Commissioner of Patents